US010282382B2

(12) United States Patent
Samuel et al.

(10) Patent No.: US 10,282,382 B2
(45) Date of Patent: May 7, 2019

(54) HYPERLINK NAVIGATING TO AN ERROR SOLUTION

(71) Applicant: Landmark Graphics Corporation, Houston, TX (US)

(72) Inventors: Robello Samuel, Houston, TX (US); Olivier Roger Germain, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 528 days.

(21) Appl. No.: 14/442,599

(22) PCT Filed: Dec. 10, 2012

(86) PCT No.: PCT/US2012/068699
§ 371 (c)(1),
(2) Date: May 13, 2015

(87) PCT Pub. No.: WO2014/092675
PCT Pub. Date: Jun. 19, 2014

(65) Prior Publication Data
US 2015/0347608 A1 Dec. 3, 2015

(51) Int. Cl.
*G06F 16/00* (2019.01)
*G06F 16/955* (2019.01)
(Continued)

(52) U.S. Cl.
CPC .......... *G06F 16/9558* (2019.01); *E21B 44/00* (2013.01); *G06F 3/04842* (2013.01); *G06Q 10/06* (2013.01)

(58) Field of Classification Search
CPC ............................... G06F 17/30; G06F 3/0484
See application file for complete search history.

(56) References Cited

U.S. PATENT DOCUMENTS

| 7,434,132 B2 | 10/2008 | Gromyko |
| 2002/0138510 A1* | 9/2002 | Tan .......................... G06F 17/21 715/206 |

(Continued)

OTHER PUBLICATIONS

International Searching Authority, International Search Report and Written Opinion, International Application No. PCT/US12/68699, which is the PCT parent of the instant application, dated Feb. 28, 2013.

(Continued)

*Primary Examiner* — Stephen S Hong
*Assistant Examiner* — Marshon L Robinson
(74) *Attorney, Agent, or Firm* — Howard L. Speight, PLLC

(57) ABSTRACT

A plurality of input data to be used to compute a first output is received. The first output is computed. It is determined that the computed first output is outside a pre-determined first-output limit. A plurality of hyperlinks is displayed on a display device. Each hyperlink provides a link to a process for making adjustments to the plurality of input data to bring the first output within the pre-determined first-output limit. Selection of one of the plurality of hyperlinks (the "selected hyperlink") is detected. A process associated with the selected hyperlink is followed to produce an adjustment to the plurality of input data to bring the first output within the first pre-determined first-output limit. The adjusted plurality of input data is used to plan implementation of a system. The sequence of selection of hyperlinks is tracked in order to reinforce the prioritization and order of future suggestions. The system is implemented.

17 Claims, 12 Drawing Sheets

(51) Int. Cl.
*G06F 3/0484* (2013.01)
*E21B 44/00* (2006.01)
*G06Q 10/06* (2012.01)

(56) References Cited

U.S. PATENT DOCUMENTS

| | | | |
|---|---|---|---|
| 2003/0130831 A1* | 7/2003 | Adir | G06F 17/5022 703/22 |
| 2005/0177373 A1 | 8/2005 | Cooper et al. | |
| 2006/0129338 A1* | 6/2006 | Turley | F17D 5/02 702/51 |
| 2008/0104521 A1* | 5/2008 | Dubinko | G06F 17/30867 715/744 |
| 2008/0188957 A1 | 8/2008 | Cutler | |
| 2009/0062933 A1 | 3/2009 | Eryurek et al. | |
| 2009/0062993 A1 | 3/2009 | Morey et al. | |
| 2009/0229819 A1* | 9/2009 | Repin | E21B 47/00 166/250.01 |
| 2010/0042379 A1* | 2/2010 | Minnaar | G06F 17/5018 703/1 |
| 2011/0072024 A1 | 3/2011 | Barney | |
| 2011/0301447 A1 | 12/2011 | Park et al. | |

OTHER PUBLICATIONS

International Bureau on Behalf of the International Searching Authority, International Preliminary Report on Patentability, International Application No. PCT/US2012/068699, which is the PCT parent of the instant application, dated Jun. 16, 2015.

* cited by examiner

| Application | Error | Solution | Date, Location, Etc. |
|---|---|---|---|
| StressCheck | Bending stress out of limit | Adjusted pipe curvature | xxxx |
| StressCheck | Fatigue ratio out of limit | Adjusted pipe fatigue endurance limit | xxxx |

FIG. 12

HYPERLINK NAVIGATING TO AN ERROR SOLUTION

BACKGROUND

Configurations of systems, such as oil field drilling systems, can be planned during a planning stage. Often, a software application is used in the planning stage. The components that make up such systems can have a number of parameters that can be adjusted through the software application during the planning stage. It can be a challenge to provide a user with help in resolving errors that arise during the planning stage.

BRIEF DESCRIPTION OF THE DRAWINGS

FIG. 12 shows a database table.

DETAILED DESCRIPTION

Figure 1:
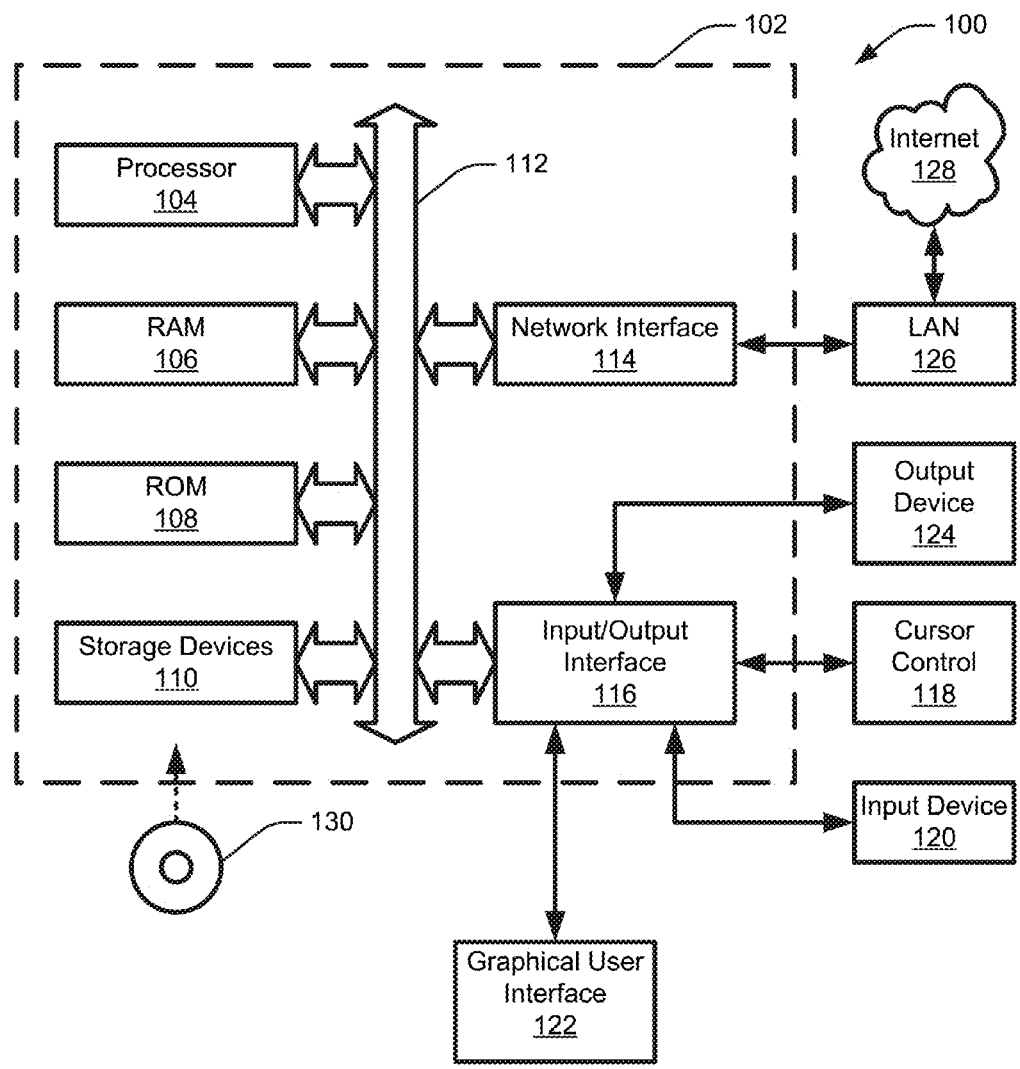
FIG. 1 shows a computer system.

In one embodiment, a computer system environment 100, illustrated in FIG. 1, includes a computer housing 102 that contains a processor 104, such as a microprocessor; a random access memory 106 ("RAM"); a read only memory 108 ("ROM"); one or more storage devices 110, such as hard drives, optical drives, solid state drives, and other similar devices; interconnected by a bus 112. In one embodiment, one or more network interfaces 114 and one or more input/output ("I/O") interfaces 116 provide external interfaces for the processor 104 through the bus 112. In one embodiment, one or more cursor control devices 118, such as a mouse, a track pad, a graphics tablet, or the like, interface with the processor 104 through the I/O interface 116 and allow a user to manipulate a cursor. In one embodiment, one or more input devices 120, such as a keyboard, a keypad, a touch sensitive screen, or the like, interface with the processor 104 through the I/O interface 116 and allow the user to input characters, numbers, drawings, and the like. In one embodiment, one or more graphical user interfaces 122 interfaces with the processor 104 through the I/O interface 116 and allows the processor 104 to display text, graphics, and other information. In one embodiment, one or more output devices 124, such as printers, plotters, or the like, interface with the processor 104 through the I/O interface 116 and, for example, allow the production of hard copy output.

In one embodiment, the processor 104 interfaces with a local area network ("LAN") 126 through the network interface 114. In one embodiment, the processor 104 can communicate with other computers through the LAN 126. In one embodiment, the processor has access to the Internet 128 through the LAN 126.

In one embodiment, a computer program to implement the techniques described herein is stored on a non-transitory computer readable medium 130, such as a compact disk ("CD"), a digital versatile disc or digital video disc ("DVD"), an external solid state drive, or the like. In one embodiment, the medium 130 is loaded into a storage device 110, such as an optical drive, and the computer program is read from the medium and stored in the RAM 106, the ROM 108, or another storage device 110, such as a hard drive. In one embodiment, the computer program is compiled and linked, if necessary, and further prepared for execution. In one embodiment, and executable image of the computer program is stored in the RAM 106, the ROM 108, or another storage device 110, such as a hard drive. In one embodiment, the processor 104 executes the executable image, receive inputs from the cursor control device 118 and input device 120, stores data in the RAM 106 and/or ROM 108, and produce outputs on the graphical user interface 122 and the output device 124.

In one embodiment, the computer system environment 100 is used to plan the implementation of a system, such as a drilling system for drilling a well for hydrocarbons. While much of this disclosure describes techniques relating to the planning of such wells, it will be understood that the techniques described herein can be used in a variety of implementation planning or realization environments, such as architectural systems used to design buildings; computer-aided design and computer-aided manufacturing systems used to design electronic and mechanical devices and the systems used to build them; and medical systems, such as surgery planning, automation, or assistance systems.

Figure 2:
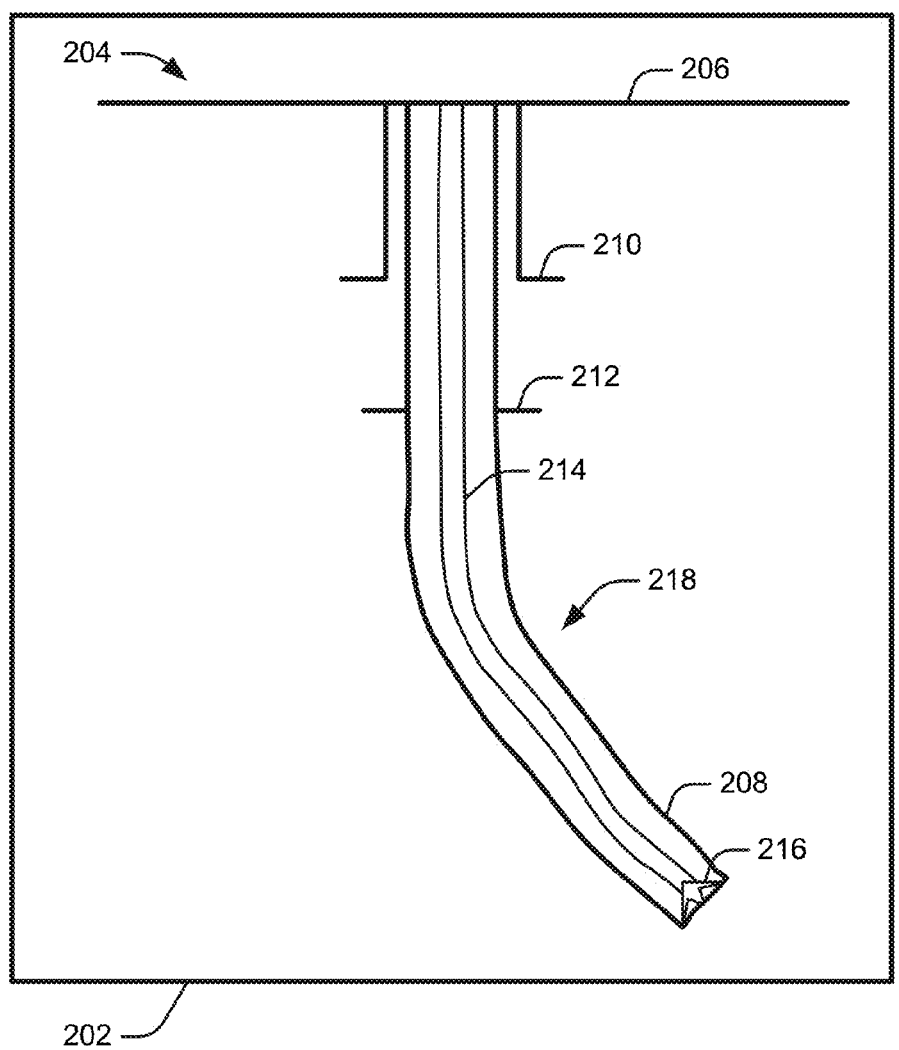
FIG. 2 shows a well schematic window.

In one embodiment, illustrated in FIG. 2, the graphical user interface 122 displays a well schematic window 202 that includes a schematic 204 of a well being planned. For simplicity of presentation, the well schematic illustrated in FIG. 2 omits details that might be shown on such a display.

In one embodiment, the schematic 204 includes a representation of the earth surface 206, a bore hole 208, a first casing 210, and a second casing 212. The schematic 204 also includes a drill string 214 and a bit 216 coupled to the bit. The schematic 204 shows an area 218 of the drill string 214 which has developed a curve that has caused a parameter, such as the bending stress, of the drill string 214 in that area 218 to be out of limits.

Figure 3:
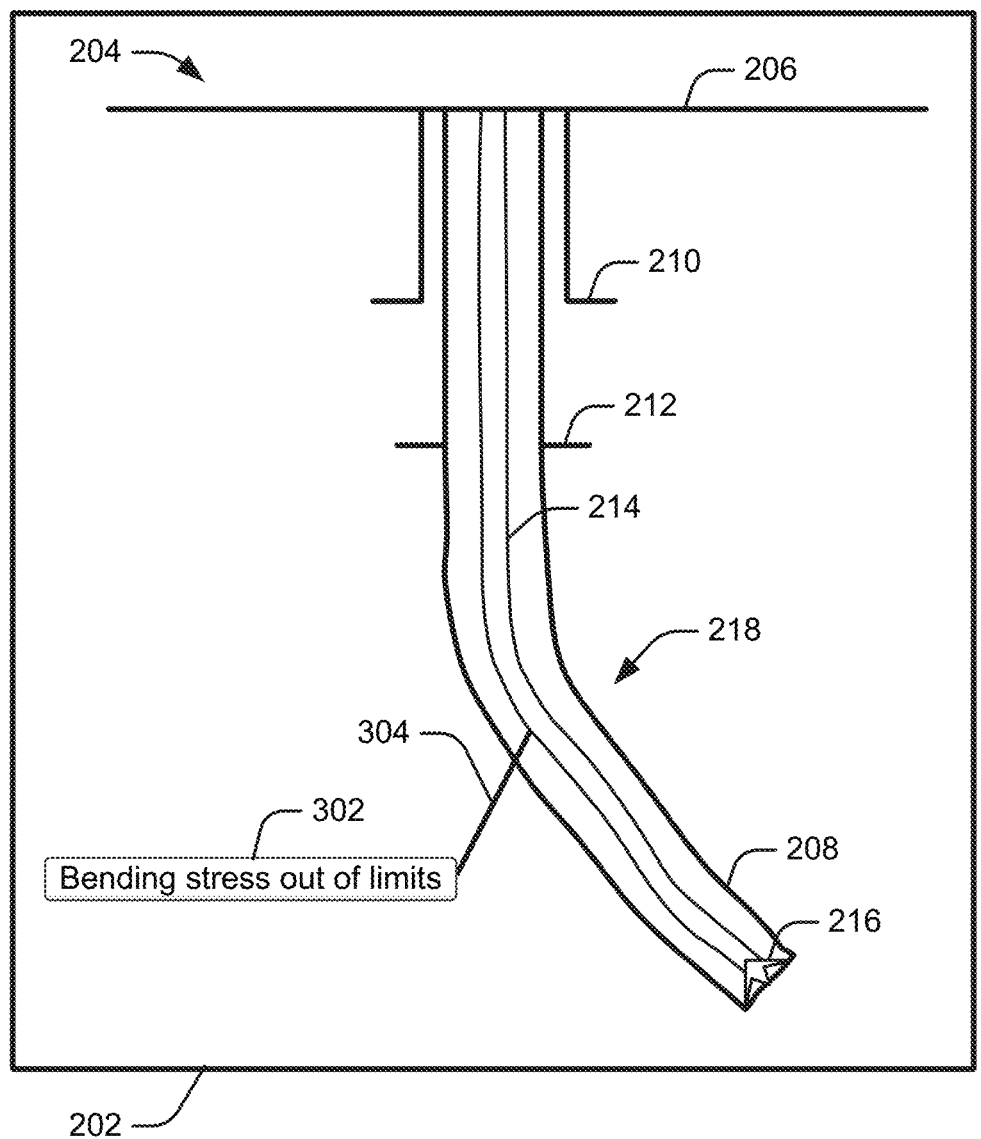
FIGS. 3-4, 8, and 10 show well schematic windows with hyperlinks.

In one embodiment, shown in FIG. 3, a hyperlink 302 appears on the screen in the vicinity of the out-of-limits condition. In one embodiment, the hyperlink 302 includes text identifying the problem that has been encountered, such as the text "Bending stress out of limits" shown in hyperlink 302. In one embodiment, an indicator, such as the line 304 shown in FIG. 3 connects the hyperlink 302 to the area where the out-of-limits condition occurred.

In one embodiment, selecting the hyperlink 302, such as by clicking on it with a mouse or track pad, or tapping on it through a touch screen, or the like, will cause the processor 104 to initiate a process to recommend a solution or solutions to the problem that has been encountered.

By way of example, consider the problem identified in FIG. 3, i.e., that "bending stress is out of limits." Bending stress can be calculated using the following equation:

$$\sigma_b = \frac{M_b \times D_p}{2I} \qquad (1)$$

where:
$M_b$=bending moment=EI $\kappa$,
E=Young's modulus,
I=axial moment of inertia,
$\kappa$=pipe curvature, and
$D_p$=pipe diameter.
Bending moment can also be expressed using the bending moment relationship:

$$\sigma_b = \frac{ED_p}{2R} \quad (2)$$

where

R is the radius of curvature (R=1/κ)

With the following given data:

Curvature is deg/100 ft=3.17 deg/100 ft=0.00055 rad/ft

Pipe diameter=8"

Modulus of elasticity=30,000,000 psi

Bending stress outside the pipe is $$\sigma_{bo} = \frac{r_0 E \kappa}{12} = \frac{\left(\frac{8}{2}\right) 30,000,000 \times 0.00055}{12} = 5500 \text{ psi} \quad (3)$$

If the limit on bending stress is set at 5,000 psi, the result will be a hyperlink error pointing towards the component which exceeds the bending stress, as shown in FIG. 3.

In one embodiment, the process recommends a solution. In one embodiment, the process proceeds by making a reverse calculation using as a constraint the variable for which limit that has been exceeded. In the bending stress calculation the variables are $D_p$, E, κ.

$$\sigma_{bo} \leq \frac{\left(\frac{D_p}{2}\right) E \times \kappa}{12} \leq 5000 \quad (4)$$

Since the modulus of elasticity (E) cannot be changed, the only variables are pipe diameter ($D_p$) and the dogleg of the wellbore (related to κ).

The options are (a) to keep the pipe diameter same and calculate the dogleg or (b) to keep the dogleg constant and calculate the minimum diameter of the pipe.

For the first option the pipe diameter remains the same and the dogleg is constrained:

$$\kappa \leq \frac{5000 \times 12}{3000000} \times \left(\frac{2}{8}\right) \leq 0.0005 \quad (5)$$

This calculation results in a dogleg of 2.865 deg/100 ft.

For the second option wellbore curvature remains the same and the pipe diameter is calculated to be:

$$\sigma_{bo} \leq \frac{\left(\frac{D_p}{2}\right) E \times \kappa}{12} \leq 5000 D_p \leq \frac{5000 \times 12 \times 2}{3000000 \times 0.00055} \leq 7.27 \text{ in} \quad (6)$$

In the above conditions there may not be an option to reduce the diameter of the pipe leaving reducing the dogleg of the well path as the only option.

Figure 4:
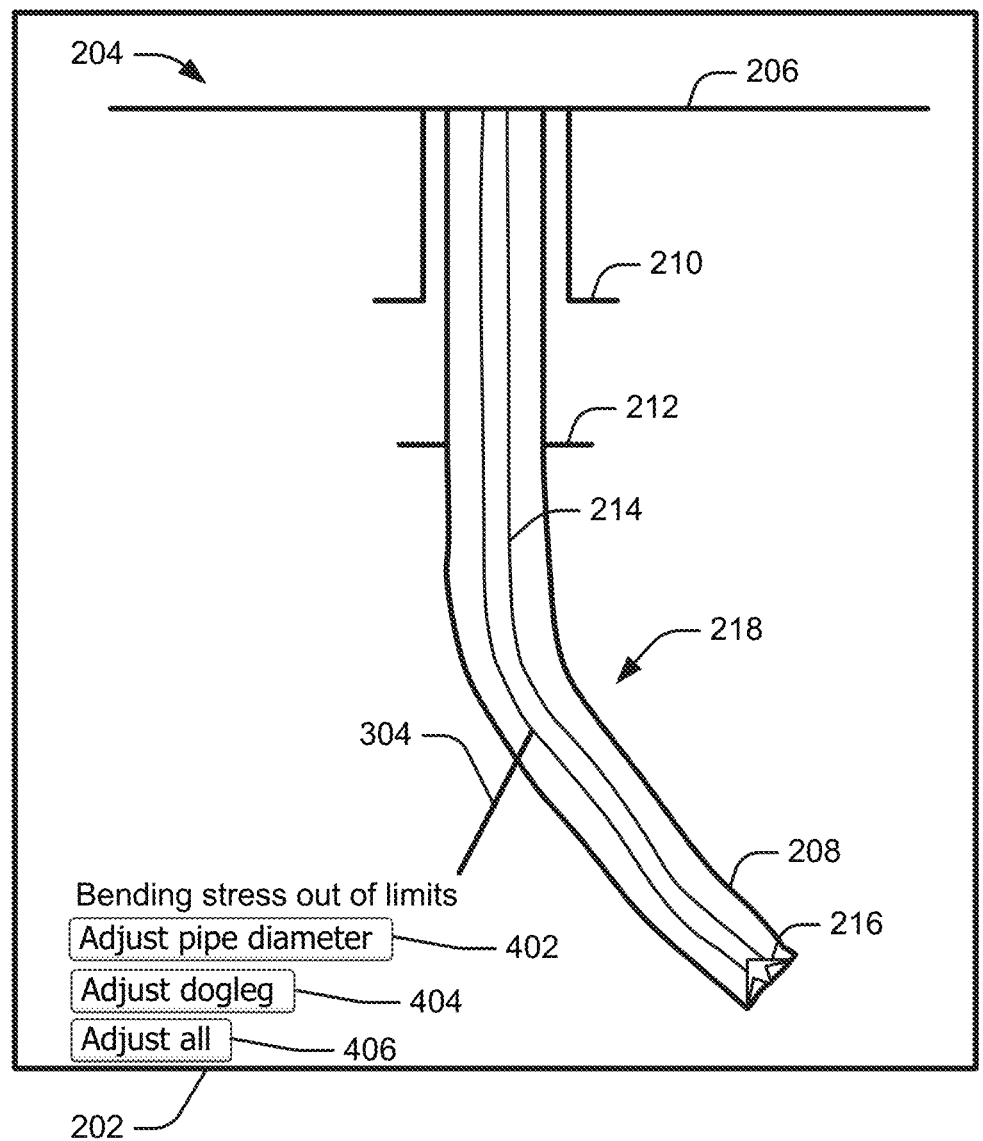

In one embodiment, assuming both options are available and the above reverse calculations result in expressions that can be solved, the process displays hyperlinks to "adjust pipe diameter" (hyperlink 402), "adjust dogleg" (hyperlink 404), and "adjust all" (hyperlink 406), as shown in FIG. 4. In one embodiment, if only one of the options is available, the process will display only the hyperlink for the available option. For example, if it is not possible to adjust the dogleg of the well path because it has been locked or because no dogleg adjustment can correct the problem, only the "adjust pipe diameter" hyperlink will be displayed.

Figure 5:
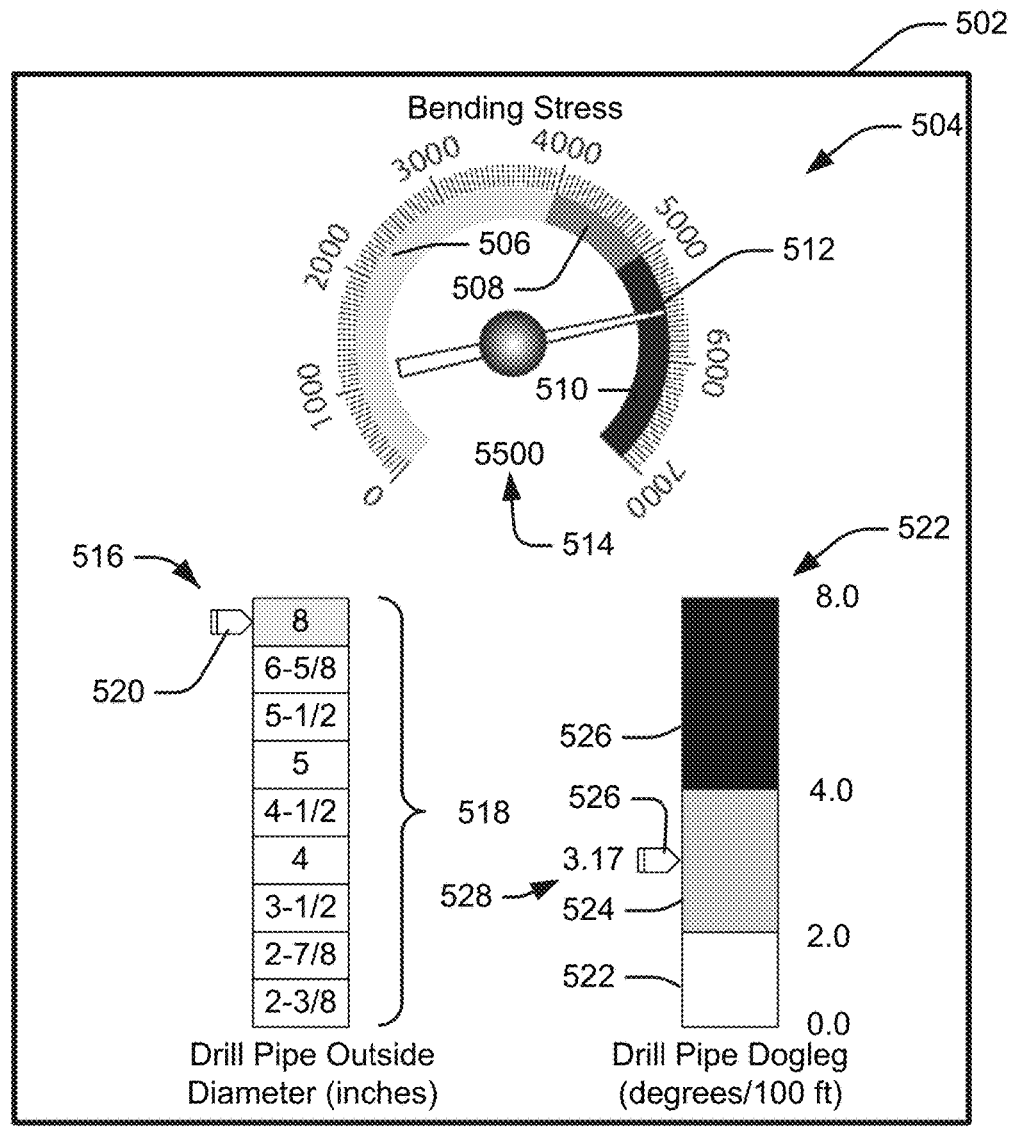
FIGS. 5-6 show dashboards.

In one embodiment, selecting the "adjust all" hyperlink will cause the process to display a way to make those adjustments, such as the dashboard 502 illustrated in FIG. 5. In one embodiment, the dashboard 502 includes a display of the out-of-limits parameter. In one embodiment, the display of the out-of-limits parameter is a dial 504 with a "good" range (i.e., from 0-4000 psi) represented by a first color 506 in an inner ring of the dial, a "caution" range (i.e., from 4000-5000 psi) represented by a second color 508 in the inner ring of the dial, and an "out-of-limits" range (i.e., from 5000-7000 psi) represented by a third color 510 in the inner ring of the dial. A needle 512 and a digital display 514 indicate the current value of the out-of-limits parameter.

In one embodiment, the dashboard 502 includes an incremental slide 516 for drill pipe outside diameter, which is a parameter that can be adjusted to particular values. The particular values 518 (i.e., 2⅜, 2⅞, 3½, 4, 4½, 5, 5½, 6⅝, and 8 inches) are displayed in, for example, blocks, in a row, either horizontally, vertically, or along a curve, and the currently selected increment (i.e., 8 inches) is highlighted, for example by shading the block associated with the currently selected increment. An incremental selector 520 allows a new selection to be made.

In one embodiment, the dashboard 502 includes a continuous slide 522 for drill pipe dogleg, which is a parameter that is not limited to discrete values, other than those imposed by the use of digital electronics. In one embodiment, the continuous slide includes a "good" range indicated by a first color 522, a "caution" range indicated by a second color 524, and a "out-of-limits" range indicated by a third color 526. In one embodiment, a continuous selector 526 allows a selection to be made. In one embodiment, a number 528 attached to the continuous selector indicates the current value (3.17 degrees/100 ft) of the dogleg.

In one embodiment, adjusting the drill pipe outside diameter using the incremental selector 520 or the drill pipe dogleg using the continuous selector 526 will change the bending stress, as discussed above. In one embodiment, such changes are reflected instantly or after a short time by the needle 512 and the digital display 514.

Figure 6:
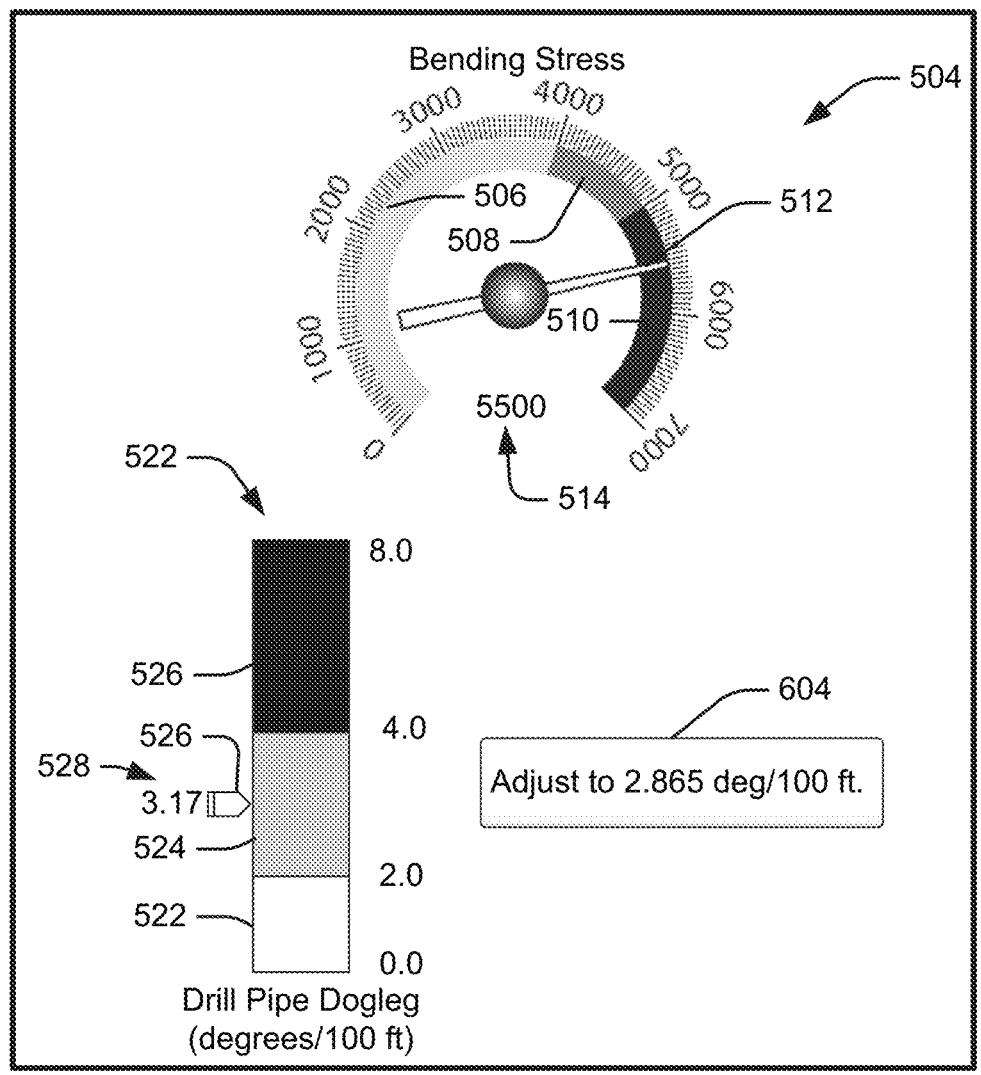

In one embodiment, illustrated in FIG. 6, a dashboard 602, which was reached by selecting the "adjust dogleg" hyperlink 404 shown on FIG. 4, includes the dial 504 and the continuous slide 522 described above in connection with FIG. 5. In one embodiment, the dashboard 602 includes a recommendation 604 (i.e., "Adjust to 2.865 deg/100 ft"), which is the recommended dogleg computed in the example above. In one embodiment, the recommendation 604 is merely text and the user is required to adjust the continuous selector 526 to the required amount. In one embodiment, the recommendation 604 is a button that, when selected, causes the dogleg to be adjusted to the recommended amount.

Figure 7:
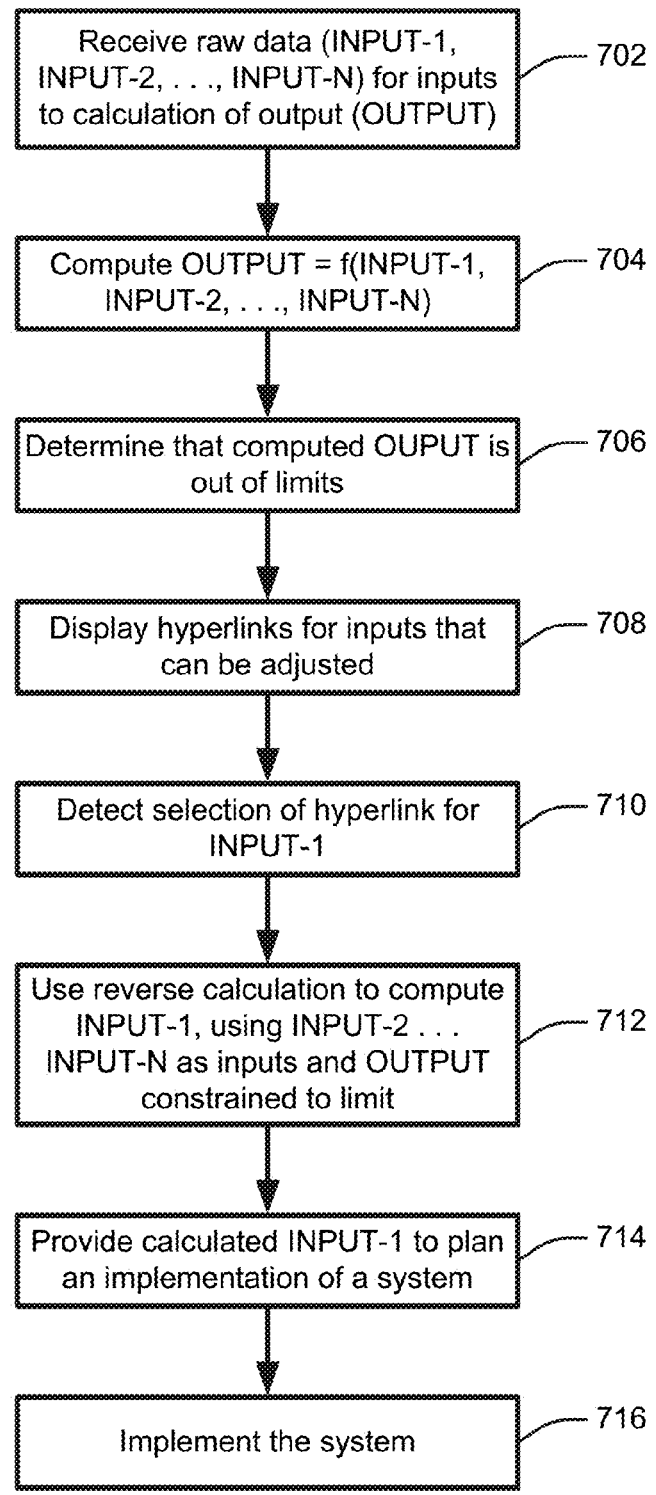
FIGS. 7 and 9 show flow charts.

In general, as shown in FIG. 7, the process receives at a processor, such as processor 104, a plurality of input data (e.g., INPUT-1, INPUT-2, . . . , INPUT-N) to be used to compute a first output (e.g., OUTPUT) (block 702). In one embodiment, the processor 104 computes the first output (i.e., OUTPUT=f(INPUT-1, INPUT-2, . . . , INPUT-N)) (block 704). In one embodiment, the processor 104 determines that the computed first output is outside a pre-determined first-output limit (block 706). In one embodiment, the processor 104 displays a plurality of hyperlinks on a display device, each hyperlink providing a link to a process for making adjustments to the plurality of input data to bring the first output within the pre-determined first-output limit (block 708). In one embodiment, the processor 104 detects selection of one of the plurality of hyperlinks (e.g., INPUT-1, the "selected hyperlink") (block 710). In one embodiment, the processor 104 follows a process associated with the selected hyperlink to produce an adjustment to the plurality of input data to bring the first output within the first pre-determined first-output limit (such as a reverse calculation of INPUT-1, using INPUT-2 . . . INPUT-N as inputs and OUTPUT constrained to limit) (block 712). In one embodiment the adjusted plurality of input data (e.g., the calculated INPUT-1) is used to plan implementation of a system (block 714). In one embodiment, the system is implemented (block 716).

Figure 8:
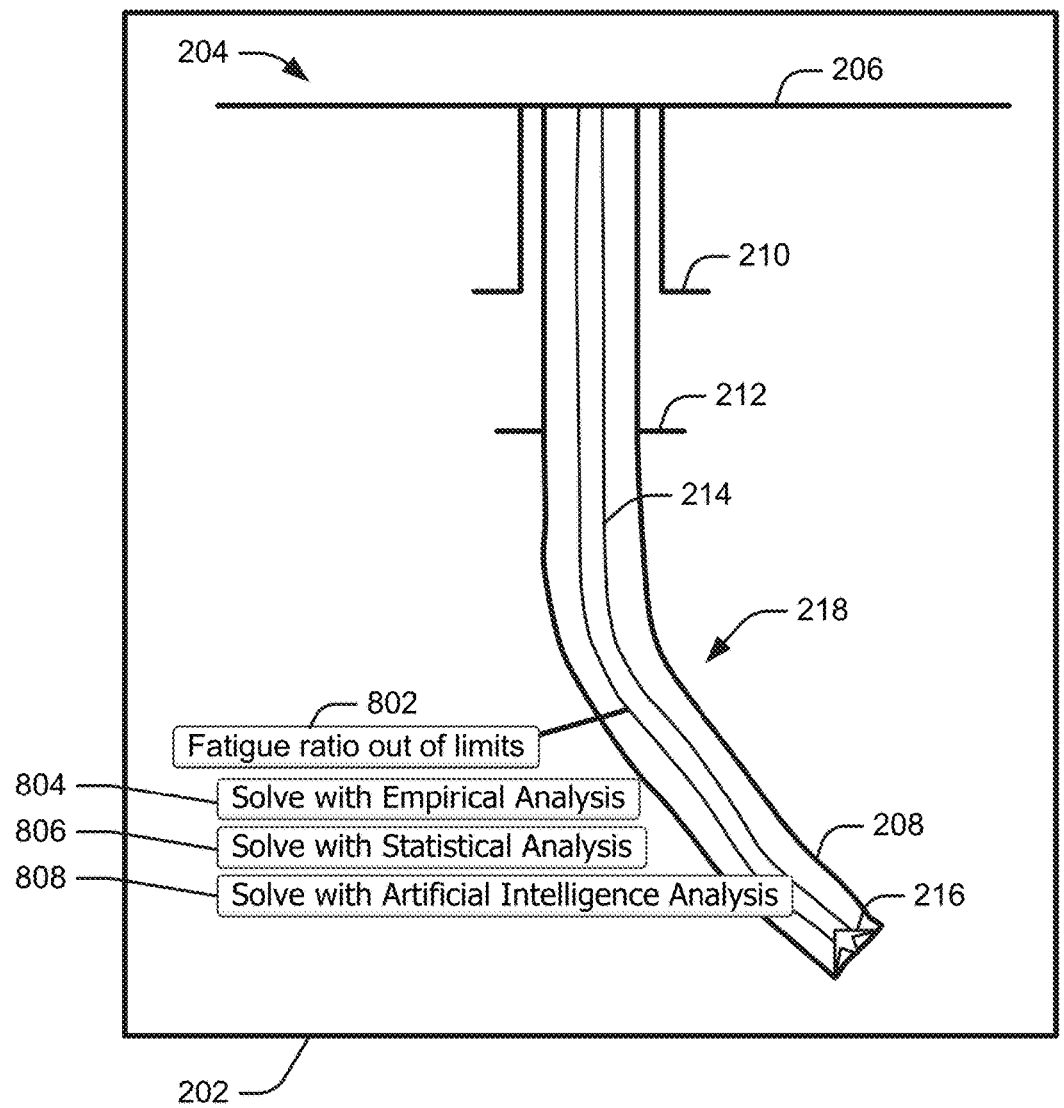

In one embodiment, illustrated in FIG. 8, a set of hyperlinks is provided to address a problem. In one embodiment, a hyperlink 802 with the legend "Fatigue ratio out of limits" is linked to the problem portion 218 of the drill string 214. In one embodiment, fatigue ratio is:

$$FR_F = \frac{|\sigma_b| + |\sigma_{buck}|}{\sigma_{fl}} \quad (8)$$

where:
$\sigma_b$=bending stress in psi,
$\sigma_{buck}$=buckling stress in psi, and
$\sigma_{fl}$=fatigue limit.
For tension the fatigue limit can be written as:

$$\sigma_{fl} = \sigma_{el}\left(1 - \frac{F_e}{F_y}\right) \quad (9)$$

where:
$\sigma_{el}$ fatigue endurance limit of the pipe in psi,
$F_e$=effective tension in lbf, and
$F_y$=yield strength of the pipe in lbf.

With the given fatigue endurance limit as well as yield strength of the pipe, keeping the buckling stress constant will result in only bending stress in the calculation. Adjusting the bending stress by adjusting the wellbore curvature may cause the fatigue ratio to be within the limits. If, after making these adjustments, the fatigue ratio is still out of limits it may be necessary to adjust the diameter of the pipe.

In one embodiment, to address this complex analytical situation, the system provides a plurality of hyperlinks. In one embodiment, the system provides three hyperlinks: a "Solve with Empirical Analysis" hyperlink 804, a "Solve with Statistical Analysis" hyperlink 806, and a "Solve with Artificial Intelligence Analysis" hyperlink 808.

Figure 9:
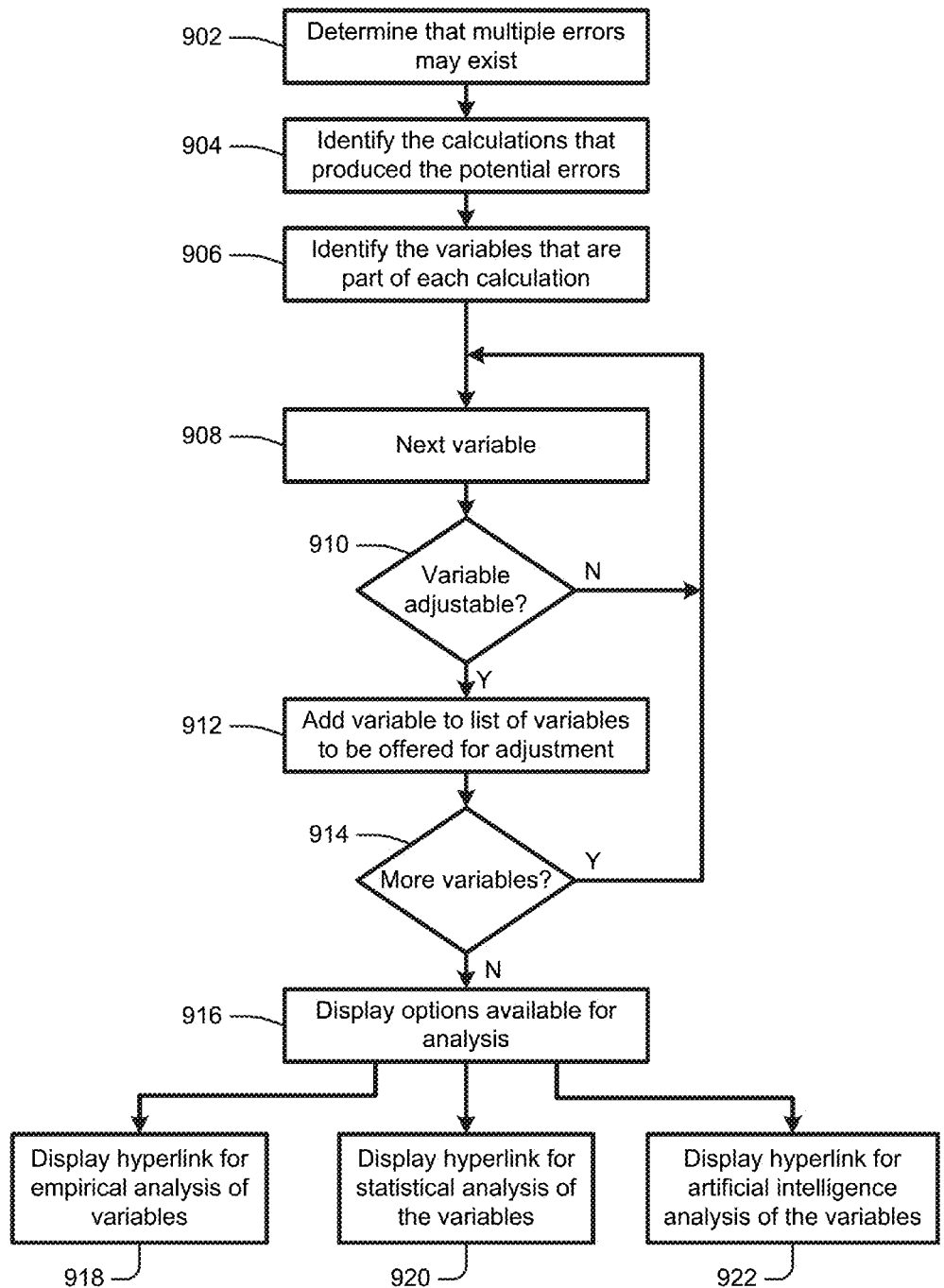

The processing underlying the presentation of the plurality of hyperlinks 804, 806, and 808, illustrated in FIG. 9, begins, in one embodiment, with the determination that multiple errors may exist (block 902). For example, as described in the example just described, the error could be in the yield strength of the pipe, the wellbore curvature, or the diameter of the pipe.

In one embodiment, the processing identifies the calculations that produced the potential errors (block 904). In the example just given, the calculations include those shown in equations (8) and (9).

In one embodiment, the processing identifies the variables that are part of each calculation (block 906). In the example just given, the variables include those listed after equations (8) and (9).

In one embodiment, the processing enters a loop (blocks 908, 910, 912, and 914) in which each variable is addressed in turn, beginning with the first variable (block 908). In one embodiment, the processing determines if the variable is adjustable (block 910). For example, the variable under consideration may not be adjustable if it has been locked, is at a limit, or has only one possible value for another reason. If the variable is not adjustable ("N" branch out of block 910), in one embodiment processing returns to block 908 to consider the next variable.

If the variable is adjustable ("Y" branch out of block 910), in one embodiment processing proceeds to block 912 where the variable under consideration is added to the list of variables to be offered for adjustment.

In one embodiment, processing then determines if more variables are available for consideration (block 914). If there are ("Y" branch out of block 914), in one embodiment processing returns to block 908 to consider the next variable.

If there are no more variables ("N" branch out of block 914), in one embodiment processing proceeds to block 916 to display options available for analysis, resulting in the display shown in FIG. 8. In one embodiment, the processing displays hyperlink 804 for an empirical analysis of the variables (block 918). In one embodiment, the processing displays hyperlink 806 for a statistical analysis of the variables (block 920). In one embodiment, the processing displays hyperlink 808 for an artificial intelligence analysis of the variables (block 922).

In one embodiment, if the "Solve with Empirical Analysis" hyperlink (804) is selected in FIG. 8, analysis described above in connection with FIGS. 4-7 is performed.

Figure 10:
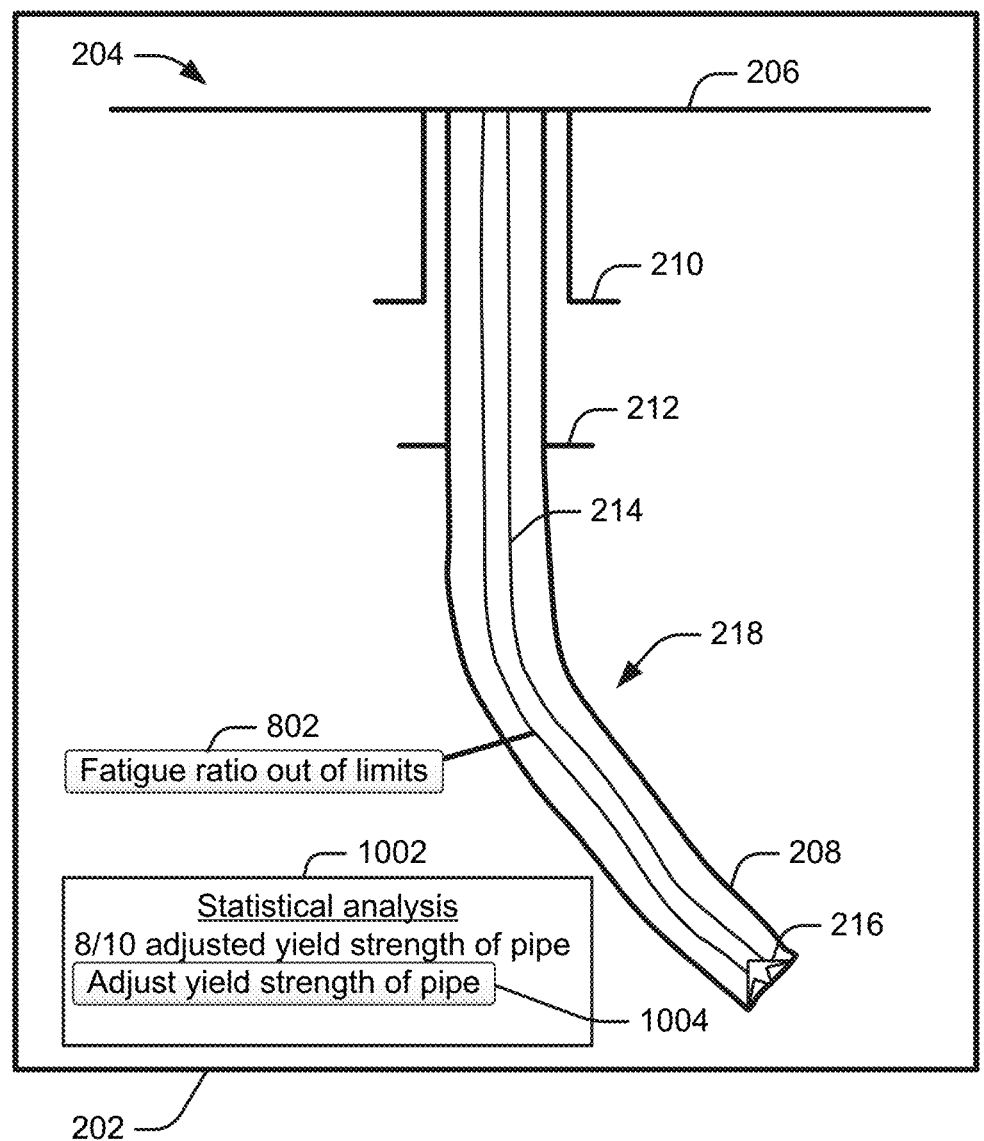

In one embodiment, if the "Solve with Statistical Analysis" hyperlink (806) is selected in FIG. 8, a statistical analysis is performed leading to a display such as that shown in FIG. 10. In one embodiment, the display includes a window 1002 displaying the results of the statistical analysis, such as "8/10 adjusted yield strength of pipe," meaning that eight of the ten users that encountered this problem solved it by adjusting the yield strength of the pipe. In one embodiment, the display would also include a hyperlink 1004 linked to a set of screens to make the adjustment, such as those shown in FIGS. 4-7.

Figure 11:
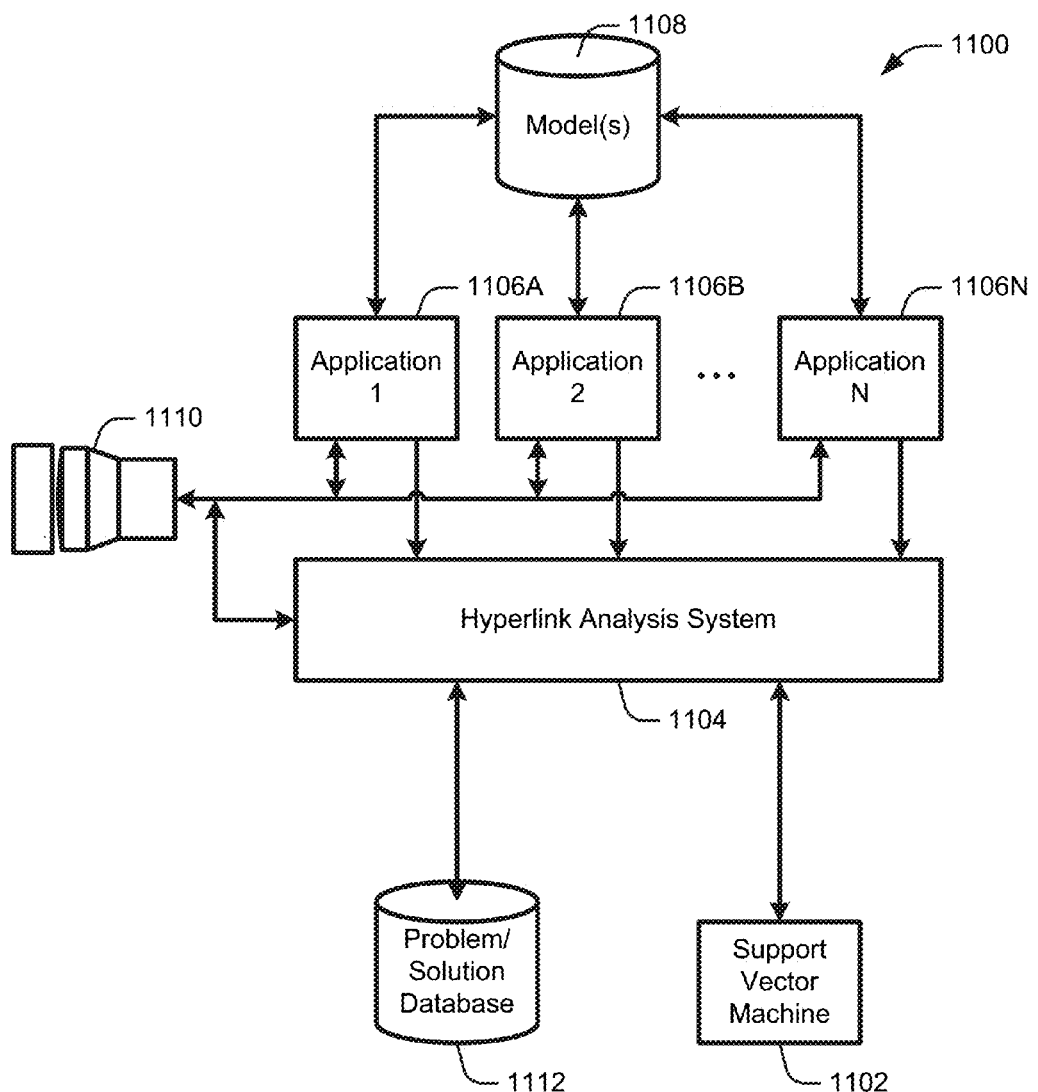
FIG. 11 shows a block diagram.

In one embodiment, if the "Solve with Artificial Intelligence Analysis" hyperlink (808) is selected in FIG. 8, a support vector machine ("SVM") 1102 (see FIG. 11, discussed below), such as a neural network, addresses the problem and proposes solutions.

In one embodiment, a system 1100 to perform the analysis described above includes a hyperlink analysis system 1104 that receives errors generated by a plurality of applications 1106A, 1106B, . . . , 1106N, some of which have access to and/or maintain a set of model(s) 1108. In one embodiment, a user 1110 has access to displays illustrated above from the applications 1106A, 1106B, . . . , 1106N and the hyperlink analysis system 1104. In one embodiment, the hyperlink analysis system 1104 maintains a problem/solution database 1112 which, in one embodiment, is used to perform the statistical analysis discussed above. In one embodiment, the support vector machine 1102 has access to the problem/solution database 1112 for its analysis.

One embodiment of the problem/solution database 1112, illustrated in FIG. 12 is a database table 1202. In one embodiment, the database table 1202 includes a plurality of columns. In one embodiment, the database table 1202 includes an "application" column 1204 that identifies the application (e.g., "StressCheck") in which an error occurred. In one embodiment, the database table 1202 includes an "error" column 1206 that identifies the error that occurred. In one embodiment, the database table 1202 includes a "solution" column 1208 that identifies the solution that was previously selected to solve the problem. In one embodiment, the database table 1202 includes a column 1210 with other information, such as the date that the solution was determined, the location of the user and/or of the problem (i.e., the location of the well), and other similar information that might be useful in a statistical or artificial intelligence analysis.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
receiving at a processor a plurality of input data to be used to determine a first output;
the processor determining the first output;
the processor determining that the first output is outside a pre-determined first-output limit;
the processor displaying a plurality of hyperlinks on a display device, each hyperlink providing a link to a process for making adjustments to the plurality of input data to bring the first output within the pre-determined first-output limit;
the processor detecting selection of one of the plurality of hyperlinks (the "selected hyperlink");
the processor following a process associated with the selected hyperlink to produce an adjustment to the plurality of input data to bring the first output within the first pre-determined first-output limit;
using the adjusted plurality of input data to plan implementation of a system; and
implementing the system;
wherein following a process comprises determining a value for the selected input data by:
using the first output and at least one of the plurality of input data that is not the selected input data,
constraining the first output to a value that is within the pre-determined first-output limit, and
setting the values of the plurality of the input data other than the selected input data to their received values; and
wherein displaying a plurality of hyperlinks comprises:
identifying a set of input data from among the plurality of input data used to determine the first output;
identifying from among the set of input data a subset of input data that:
can be adjusted, and
can be adjusted to bring the first output within the pre-determined first-output limit, and
displaying hyperlinks representing each of the input data in the subset of input data.

2. The method of claim 1 wherein:
displaying a plurality of hyperlinks on the display device comprises displaying a hyperlink for each of the plurality of input data that can be adjusted; and
detecting selection of the selected hyperlink comprises detecting the "selected hyperlink" representing one of the plurality of input data (the "selected input data").

3. The method of claim 1 wherein using the first output and at least one of the plurality of input data that is not the selected input data comprises:
solving a system of equations.

4. The method of claim 1 further comprising:
the processor determining a second output using at least some of the plurality of input data; and
the processor determining that the second output is outside a pre-determined second-output limit;
wherein displaying a plurality of hyperlinks comprises:
identifying a set of input data from among the plurality of input data used to determine the second output;
identifying from among the set of input data a second subset of input data that:
can be adjusted, and
can be adjusted to:
bring the second output within the pre-determined second-output limit; and
displaying hyperlinks representing each of the input data in the second subset of input data.

5. The method of claim 1 wherein:
a first of the plurality of hyperlinks is associated with a process using an empirical analysis of the input data to make adjustments to the plurality of input data to bring the first output within the pre-determined first-output limit;
a second of the plurality of hyperlinks is associated with a process using a probabilistic analysis of the input data to make adjustments to the plurality of input data to bring the first output within the pre-determined first-output limit;
a third of the plurality of hyperlinks is associated with a process using an artificial intelligence analysis of the input data to make adjustments to the plurality of input data to bring the first output within the pre-determined first-output limit.

6. The method of claim 1 further comprising:
storing in a problem/solution database a record of:
the determination that the first output was outside a pre-determined first-output limit; and
the adjustment to the plurality of input data to bring the first output within the first pre-determined first-output limit.

7. The method of claim 1 further comprising:
the process associated with the selected hyperlink being a process selected from the group consisting of an empirical analysis, a probabilistic analysis, and an artificial intelligence analysis;
the process comprising accessing a problem/solution database comprising a record of:
a previous determination that the first output was outside a pre-determined first-output limit; and
a previous adjustment to the plurality of input data to bring the first output within the first pre-determined first-output limit.

8. A computer program stored in a non-transitory computer readable storage medium, the program comprising executable instructions that cause a processor to:
receive a plurality of input data to be used to determine a first output;
determine the first output;
determine that the first output is outside a pre-determined first-output limit;

display a plurality of hyperlinks on a display device, each hyperlink providing a link to a process for making adjustments to the plurality of input data to bring the first output within the pre-determined first-output limit;
detect selection of one of the plurality of hyperlinks (the "selected hyperlink"); and
follow a process associated with the selected hyperlink to produce an adjustment to the plurality of input data to bring the first output within the first pre-determined first-output limit;
wherein when following a process, the processor determines a value for the selected input data by:
using the first output and at least one of the plurality of input data that is not the selected input data,
constraining the first output to a value that is within the pre-determined first-output limit, and
setting the values of the plurality of the input data other than the selected input data to their received values; and
wherein, when displaying a plurality of hyperlinks, the processor:
identifies a set of input data from among the plurality of input data used to determine the first output;
identifies from among the set of input data a subset of input data that:
can be adjusted, and
can be adjusted to bring the first output within the pre-determined first-output limit; and
displays hyperlinks representing each of the input data in the subset of input data.

9. The computer program of claim 8 wherein:
when displaying a plurality of hyperlinks on the display device, the processor displays a hyperlink for each of the plurality of input data that can be adjusted;
when detecting selection of the selected hyperlink, the processor detects the "selected hyperlink" representing one of the plurality of input data (the "selected input data").

10. The computer program of claim 8 wherein, when using the first output and at least one of the plurality of input data that is not the selected input data, the processor:
solves a system of equations.

11. The computer program of claim 8 wherein the processor:
determines a second output using at least some of the plurality of input data;
determines that the second output is outside a pre-determined second-output limit;
wherein, when displaying a plurality of hyperlinks, the processor:
identifies a set of input data from among the plurality of input data used to determine the second output;
identifies from among the set of input data a second subset of input data that:
can be adjusted, and
can be adjusted to:
bring the second output within the pre-determined second-output limit; and
displays hyperlinks representing each of the input data in the second subset of input data.

12. The computer program of claim 8 wherein:
a first of the plurality of hyperlinks is associated with a process using an empirical analysis of the input data to make adjustments to the plurality of input data to bring the first output within the pre-determined first-output limit;
a second of the plurality of hyperlinks is associated with a process using a probabilistic analysis of the input data to make adjustments to the plurality of input data to bring the first output within the pre-determined first-output limit;
a third of the plurality of hyperlinks is associated with a process using an artificial intelligence analysis of the input data to make adjustments to the plurality of input data to bring the first output within the pre-determined first-output limit.

13. The computer program of claim 8 further comprising:
the processor storing in a problem/solution database a record of:
the determination that the first output was outside a pre-determined first-output limit; and
the adjustment to the plurality of input data to bring the first output within the first pre-determined first-output limit.

14. The computer program of claim 8 further comprising:
the process associated with the selected hyperlink being a process selected from the group consisting of an empirical analysis, a probabilistic analysis, and an artificial intelligence analysis;
the process comprising accessing a problem/solution database comprising a record of:
a previous determination that the first output was outside a pre-determined first-output limit; and
a previous adjustment to the plurality of input data to bring the first output within the first pre-determined first-output limit.

15. A system comprising:
a processor;
a memory;
an input device;
a display device;
a plurality of applications running on the processor, each application programmed to produce an error message;
a hyperlink analysis system running on the processor, the hyperlink analysis system programmed to:
detect an error message from one of the plurality of applications,
display on the display device a plurality of hyperlinks, each hyperlink linked to a process to resolve the error message,
detect selection of one of the plurality of hyperlinks through the input device, and
initiate the process linked to the selected hyperlink;
wherein displaying a plurality of hyperlinks comprises:
identifying data from the one of the plurality of applications that is a cause for the one of the plurality of applications to produce the error message and that can be adjusted to eliminate the cause of the error message, and
displaying hyperlinks representing each of the identified data;
a model accessible by the applications, the model being useful to plan the implementation of a product; and
the model providing an output through the display device whereby the system product is implemented.

16. The system of claim 15 wherein the process linked to the selected hyperlink accesses a support vector machine.

17. The system of claim 15 wherein:
the process accesses a problem/solution database comprising records of:
previous error messages issued from the application that issued the detected error message; and previous solutions to error messages issued from the application that issued the detected error message.

\* \* \* \* \*